United States Patent [19]
Ball

[11] 3,793,141
[45] Feb. 19, 1974

[54] NUCLEAR REACTOR CONTROL SYSTEM

[75] Inventor: Russell M. Ball, Lynchburg, Va.

[73] Assignee: The Babcock & Wilcox Company, New York, N.Y.

[22] Filed: Sept. 29, 1972

[21] Appl. No.: 293,634

Related U.S. Application Data

[63] Continuation-in-part of Ser. No. 38,818, May 19, 1970, abandoned.

[52] U.S. Cl. ................. 176/36 R, 137/814, 176/22
[51] Int. Cl. .............................................. G21c 7/16
[58] Field of Search ...................... 176/22-24, 36 R; 137/814, 815, 819

[56] References Cited
UNITED STATES PATENTS

| | | | |
|---|---|---|---|
| 3,442,759 | 5/1969 | Molle et al. | 176/36 |
| 3,479,250 | 11/1969 | Ripley | 176/36 |
| 3,136,698 | 6/1964 | Mann | 176/36 |
| 3,533,912 | 10/1970 | Dempsey | 176/36 |
| 3,486,975 | 12/1969 | Ripley | 176/36 |

FOREIGN PATENTS OR APPLICATIONS 1,073,557  6/1967  Great Britain ....................... 176/36

Primary Examiner—Harvey E. Behrend
Attorney, Agent, or Firm—J. Maguire

[57] ABSTRACT

A nuclear reactor in which the neutron absorber rods are positioned by fluid power applied in accordance with binary coded command signals in fluidic form and piped to a decoder within the reactor pressure vessel.

6 Claims, 7 Drawing Figures

FIG.4
| ADDRESS INPUT | | COMMAND OUTPUT | | OUTPUT | | | | | |
|---|---|---|---|---|---|---|---|---|---|
| LINE 32A | LINE 32B | LINE 32C | LINE 32D | LINE 33A | LINE 34A | LINE 33B | LINE 34B | LINE 33C | LINE 34C |
| 1 | 1 | 0 | 1 | 1 | 0 | 0 | 0 | 0 | 0 |
| 1 | 1 | 1 | 0 | 0 | 1 | 0 | 0 | 0 | 0 |
| 0 | 1 | 0 | 1 | 0 | 0 | 1 | 0 | 0 | 0 |
| 0 | 1 | 1 | 0 | 0 | 0 | 0 | 1 | 0 | 0 |
| 1 | 0 | 0 | 1 | 0 | 0 | 0 | 0 | 1 | 0 |
| 1 | 0 | 1 | 0 | 0 | 0 | 0 | 0 | 0 | 1 |
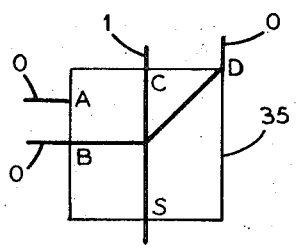
FIG.3A
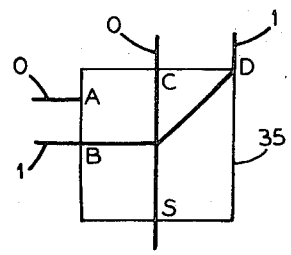
FIG.3B
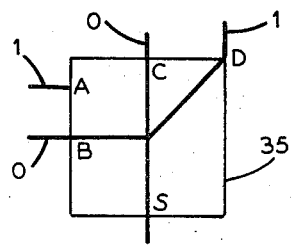
FIG.3C
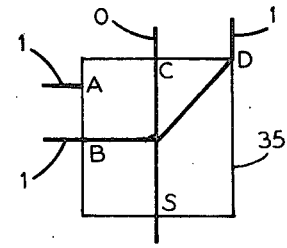
FIG.3D

NUCLEAR REACTOR CONTROL SYSTEM

This is a continuation-in-part of Application Ser. No. 38,818, filed May 19, 1970, now abandoned.

This invention relates in general to the control of nuclear reactors and more particularly to a nuclear reactor control system in which the reactivity level of the core is controlled by neutron absorber members moveable by fluid power in respective guide passages extending within the core.

In general, the movement of selected neutron absorber rods into and out of a reactor core by directing the flow of fluid through guide tubes surrounding the rods is known in the prior art, as exemplified by British Patent 1,164,261. However, with the type of system proposed by British Patent 1,164,261, each rod to be controlled requires the rapid cyclical operation of a flow reversing valve within the reactor pressure vessel. Consequently, the number of valve control lines that must be brought through the vessel wall is equal to the number of moveable absorber rods, which in the case of a typical power reactor is a considerable number, in the order of 1,000.

The invention provides a reactor control system in which the neutron absorber rods are positioned by fluid power applied in accordance with binary coded command signals in fluidic form and piped to a decoder within the reactor pressure vessel.

According to a preferred embodiment of the invention, a bistable fluidic flow controller is provided inside the vessel for each moveable rod. The controller is actually a fluidic flip-flop and has fluid supply input disposed for communication with a source of pressurized motive fluid, a first output disposed for communication with the rod guide tube, a second output disposed for communication with a dump zone, a set trigger input and a reset trigger input, the supply input is communicated with the first output to establish in the guide tube a fluid flow sufficient to drive the rod to its extreme out-core position and holding the rod thereat until the reset input is triggered, even though no signal is continuously maintained at the set input. With the rod at the out-core position, a fluidic trigger signal applied to the reset input will operate the controller to switch its supply input into communication with its second output, therefore diverting fluid flow from the guide tube to the dump zone and causing the rod to return to its extreme in-core position by gravity.

The fluidic trigger signals that are applied to the flip-flop rod controllers are derived from a fluidic decoder that is also located within the pressure vessel.

The deocder responds to command signals supplied from an external source and piped through the vessel wall in fluidic form. The command signals are in the form of binary coded words, each word containing information addressing a selected rod to be shifted, and information specifying the direction of the shift. Such coding has the advantage of allowing, even with parallel from command word input to the decoder, the addressing and control of a relatively large number of rods with just a few fluidic input lines passing through the vessel wall. For example, a thirteen binary bits command word can be carried in parallel form by thirteen separate input lines. Using two binary bits to specify the rod shift direction, i.e., incore or out-core, the remaining eleven bits allow addressing any one of 1.024 rods.

Should it be desired to use serial coding of command words, two fluidic input lines, one carrying the bit information and the other acting as the "clock" or shift command would suffice for any number of rods, of course, subject to the disadvantage that the maximum number or rods which would be commanded per unit time would be limited by the fluidic clocking frequency. For a thirteen-bit word, with parallel in-put to the decoder, thirteen rod commands could be received in the same time required to receive a single rod command with serial input to the decoder.

For a better understanding of the invention, reference should be had to the accompanying drawings and detailed description thereof.

FIGS. 3 A through 3 D are detailed schematics of an OR/NOR logic device with each representing a different set of logic units.

Figure 1:
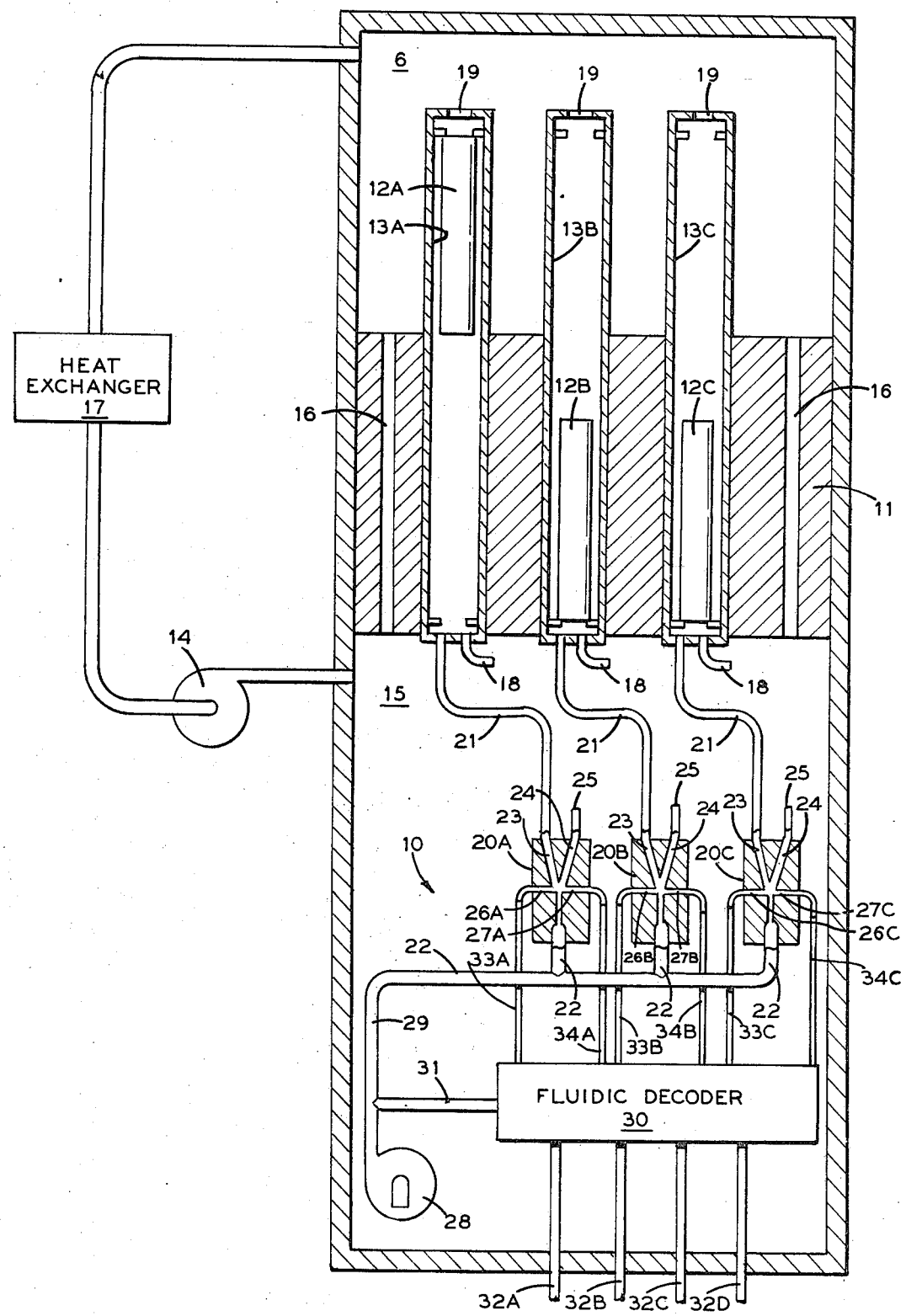
FIG. 1 is a schematic sectional view of a nuclear reactor control system according to a preferred embodiment of the invention.
Figure 2:
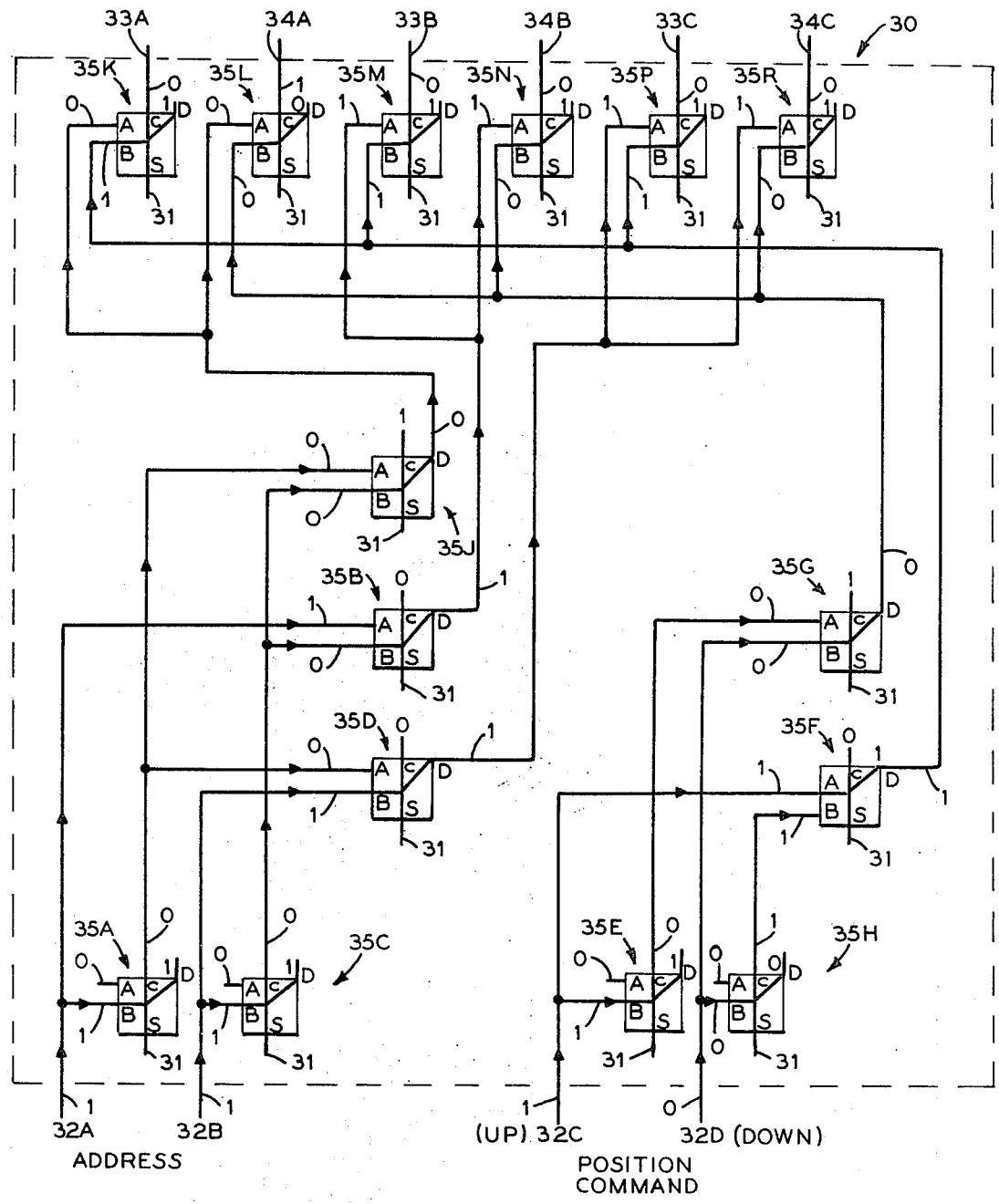
FIG. 2 is a schematic diagram of the fluidic decoder of FIG. 1 incorporating the logic state required to command neutron absorber rod 12 A of FIG. 1 into the out-core position.

FIG. 4 is a truth table showing the six possible combinations of logic states corresponding to the decoder 30 of FIGS. 1 and 2.

Referring now to FIGS. 1 through 4, the nuclear reactor control system 10 of the instant invention is adapted for general use in a nuclear reactor having a core 11 from which useful heat energy is extracted by a coolant fluid that is circulated through the core 11.

The reactivity level of core 11 is controlled by a plurality of neutron absorber rods 12 A, 12 B, 12 C moveable axially in respective guide passages 13 A, 13 B, 13 C extending within and also beyond core 11. It is to be understood that the number of neutron absorber rods in a working model reactor equipped with the control system of the invention will be the order of 1,000, but for the purpose of simplification herein, three typical rods 12 A-C and passages 13 A-C are shown in the drawing.

CIrculation of the coolant fluid is effected by a pump 14 having an outlet communicating with a core inlet zone 15. Coolant delivered into zone 15 passes through core 11 via coolant flow passages 16 and guide passages 13 A-C, and is collected in a core outlet zone 6 whereupon the coolant passes through a heat exchanger 17 to give up the heat extracted in passing through core 11 and thence is returned to inlet of pump 14.

To assure sufficient cooling, each of the guide passages 13 A-C are at all times communicated with the core inlet and outlet zones 15 and 6 by means of restricted inlet 18 and an outlet 19. The inlet 18 is sized so as to establish, with the normal pressure differential between zones 15 and 6, a flow through the associated passage, 13 A-C sufficient to meet cooling requirements, but not so great as to shift the rods 12 A-C, which are in the flow, from their in-core position up to their out-core position, or to hold the rods 12 A-C, in their out-core position against gravitational forces tending to return them to their in-core or minimum reactivity position. To assure a fail-safe design, the guide passages 13 A-C are generally vertical and the rod out-core positions are elevated above their in-core position, such as rod 12 A shown in the out-core position, will upon interruption of coolant circulation, drop to the in-core position to effect shutdown of the reactor.

Movement of each rod 12 A-C to the out-core position is effected by augmenting the normal steady state flow through its passages 13 A-C, which is accomplished by operating a corresponding bistable, or flip-flop into the passage 13 A-C through a conduit 21 connected thereto.

Each flip-flop controller 20 A-C is a bistable fluidic device, well known in the prior art, and having a supply input 22, and an output 23 communicated with a respective guide passage 13 A-C through a conduit 21 and an output or vent 24 communicated with the core inlet zone 15 by a conduit 25. Supply inputs 22 for all controllers 20 A-C are communicated with the discharge line 29 of a pump 28, the latter having an inlet communicating with the core inlet zone 15, for supplying the fluid power for moving the rods 12 A-C. In the particular example shown, the same fluid is used for moving the rods 12 A-C as is used for core cooling, but, if desired a different and compatible fluid could be used.

Controllers 20 A-C are disposed to receive trigger signal inputs in fluidic form at their set and reset inputs, 26 A-C and 27 A-C. A trigger signal applied to the reset inputs 27 A-C of any controller 20 A-C will cause the supply input 22 thereof to be communicated with the output 23 thereof. This will produce supplemental flow in the corresponding guide passages 13 A-C and drive the rod 12 A-C therein to the out-core position, resulting in an increase of overall core 11 reactivity. A trigger signal applied to the set input 26 A-C of any controller 20 A-C will cause its supply input 22 to be communicated with its output 24 which in effect will interrupt any previously established supplemental rod-out flow in the associated guide passages 13 A-C and dump such fluid as passes through the controller 20 A-C into core inlet zone 15, thereby causing the rod 12 A-C to drop into core 11 if previously at the out-core position, or remain at the in-core position if previously thereat. The controllers 20 A-C are so constructed and arranged that to maintain a given flow state, it is not necessary to maintain a continuous trigger signal at the input 26 A-C or 27 A-C that was triggered to establish the present flow state. Consequently, any selected controller 20 A-C could be switched from one complementary state to the other without regard to whether the rod 12 A-C has arrived at the equilibrium, and hence the rod command rate, in terms of the number of rods commanded per minute can be faster than the rod transit time between the in-core and out-core positions.

Operation of the controllers 20 A-C is effected with trigger signals supplied in fluidic form by decoder 30 through output transmission lines 33 A-C and 34 A-C and applied to the set and reset inputs 26 A-C and 27 A-C of corresponding controllers 20 A-C. The decoder 30 receives its supply of pressurized control fluid from the pump 28 through an inlet line 31 which communicates with the pump discharge line 29.

Decoder 30 has inputs disposed to receive command signals presented in the form of words that are expressed in binary coded fluidic form. To each of these inputs there is coupled a separate fluidic signal transmission line so that the decoder 30 has an input interface disposed to receive command signals in parallel logic form thereby allowing simultaneous entry of a command word having as many binary bits as there are transmission lines. For example, in a nuclear reactor equipped with 1,024 neutron absorber rods, there is a requirement of only 13 fluidic input lines to be passed through the reactor vessel wall. Each line represents a given binary bit in the command word and the value of such bit, in terms of logic values "1" or "0", is represented by the pressure of the fluid in such line with one pressure level corresponding to the value "1" and another level corresponding to the value "0." The number of input lines required for parallel input to decoder 30 is determined by the number of rods in the reactor, since each command word is required to contain a number of bits sufficient to address any selected one of the several neutron absorber rods plus two bits to identify the command direction, either in-core or out-core, of the rod addressed. Accordingly, a total of thirteen input lines are required, two lines for commanding the rod position and eleven lines for addressing 1,024 ($2^{10}$) rods.

For purposes of simplification herein, there are shown only three neutron absorber rods 12 A-C, with 12 A being in the out-core position and 12 B-C being in the in-core position. The rods 12 A-C are commanded through four separate fluidic transmission lines 32 A-D communicating with the input interface of decoder 30 and providing an input capacity of 4 bits per command word, the latter being apportioned as 2 bits for addressing the rods to be commanded and 2 bits for commanding the rods. Lines 32 A-B have been designated to carry the 2 bits used to address the rods to be commanded and the lines 32 C-D carry the 2 bits used to command the position of the addressed rods.

Referring now to FIG. 2, there is shown a schematic diagram of the fluidic decoder 30 using OR/NOR logic to transform a binary input signal to a decimal output. The binary input signal is introduced through lines 32 A-D into the decoder 30 and is therein transformed through a series of OR/NOR gates 35 A-R to a decimal output which is transmitted by lines 33 A-C and 34 A-C to corresponding set and reset inputs 26 A-C and 27 A-C of controllers 20 A-C. The diagram of FIG. 2 incorporates the logic state required to command the neutron absorber rod 12 A to its out-core position, as depicted in FIG. 1.

Referring now to FIGS. 3 A-D, there are shown fluidic devices or gates 35 using OR/NOR logic. Each of these devices utilizes both momentum interaction and wall attachment to produce a digital signal. In the absence of a control signal, i.e., an "0" value at both input ports A and B, as shown in FIG. 3 A, the power stream of control fluid entering at supply port S will always flow from the NOR output port C, since asymetry in the control region causes the power stream to attach to the NOR leg wall. If either or both input A and B are provided with a control signal having a "1" value as shown in FIGS. 3 B, 3 B and 3 D, the power stream will be switched to the OR output D.

Referring now to FIG. 4, there is shown a truth table representing the six possible combinations of logic states corresponding to decoder 30 as outlined in FIG. 2. The logic state enumerated in line 2 is the result of the input and output used in FIG. 2 to obtain the neutron absorber rod position depicted in FIG. 1.

The following is a description, with reference to FIG. 2 of the sequence of operations taking place as the neutron absorber rod 12 A is moved from the in-core (down) position to the out-core (up) position. Input values of "1" are simultaneously introduced through address lines 32 A and 32 B and "Up" command line 32 C, the "Down" command line remains with a "0" value input. The input value "1" from address line 32 A is transmitted to input port B of gate 35 A and input port A of gate 35 B whereas the input value "1" from address line 32 B is transmitted to the respective input ports B of gates 35 C and 35 D. The input value "1" from "Up" command line 32 C is transmitted to input port B of gate 35 E and input port A of gate 35 F whereas to "0" value input from "Down" command line 32 D is transmitted to the respective input ports B of gates 35 G and 35 H.

On the address side of the decoder 30, the values of "0" and "1" received by the respective input sides of gates 35 A and 35 C cause the pressurized fluidic flow from line 31 through port S to be switched from the NOR output C to the vented OR output D. The "0" value output C from gate 35 A is transmitted to the input ports A of the gates 35 J and 35 D whereas the "0" value output C from gate 35 C is transmitted to input ports B of gates 35 J and 35 B. With "0" values being received at input ports A and B of gate 35 J, the pressurized fluidic flow therein continues to be vented through the NOR output port C while a "0" value signal is transmitted through the OR output port D to the respective input ports A of gates 35 K and 35 L. With "1" and "0" values being received on input ports A and B of gate 35 B, the pressurized fluidic flow is switched from the NOR output of C to the OR output D and is transmitted to the respective input ports A of gates 35 M and 35 N. With "0" and "1" values being received on input ports A and B of gate 35 D, the pressurized fluidic flow is switched from the NOR output C to the OR output D and is transmitted to the respective input ports A of gates 35 P and 35 R.

On the position command side of the decoder 30, the values of "0" and "1" are received at the input ports A and B of gate 35 E cause the pressurized fluidic flow from line 31 through port S to be switched from the NOR output C to the vented OR output D, the "0" value from output C is transmitted to the input port A of gate 35 G. The values of "0" received at the inputs A and B of gate 35 H cause the pressurized fluidic flow to continue to be transmitted through the NOR output C to the input B of gate 35 F. With "0" values being received at inputs A and B of gate 35 G, the pressurized fluidic flow therein continues to be vented through the NOR output port C while a "0" value signal is transmitted through the OR output port D to the respective input ports of gates 35 L, 35 N and 35 R. With "1" values being received at inputs A and B of gate 35 F, the pressurized fluidic flow is switched from the NOR output C to the OR output D and is transmitted to the respective input ports B of gates 35 K, 35 M and 35 P.

Thus, it is seen that values of "1" are transmitted to one or both of the input ports A and B of gates 35 K, 35 M, 35 N, 35 P and 35 R thereby causing the pressurized fluidic flow therein to be switched to the vented OR output port D while having a "0" value at the NOR output port C. Gate 35 L, on the other hand, receives a "0" value input at both of the input ports A and B thereby causing the pressurized fluidic flow to continue to be transmitted through the NOR output port C and into the decoder output transmission line 34 A which communicates with the reset input line 27 A of flow controller 20 A. The pressurized fluidic flow strikes the power stream flowing from supply input line 22 and causes it to flow through output 23 into line 21 to produce the supplemental flow in guide passage 13 A required to drive the neutron absorber rod 12 A to the out-core position.

The decoder 30 and each of the flow controllers 20 A-C, etc., are, according to the invention located inside the reactor pressure vessel and within the coolant inlet zone 15. The input lines 32 A-D thus extend through the pressure vessel wall W. Preferably, the flow controllers 20 A-C and decoder 30 are of the type having no moving parts, since the environment inside the pressure vessel is known to present difficulties to maintaining reliable operations of any parts that must necessarily move.

The constructional details of the decoder 30 can be varied by the artisan in accordance with currently known packaging techniques for fluidic logic circuitry. In this regard, it should be noted that a choice of decoder 30 logic components can be made so that it is not necessary to maintain any steady state fluid flow through the input lines 32 A-D. Such avoidance of flow through lines 32 A-D can be realized by decoder logic input components responsive to fluid pressure variations.

Any packaged combinations of known fluidic logic components can be used to construct decoder 30 provided that such combination meets the essential requirements of the invention in that for each command word presented to decoder 30 the flow controller 20 A-C, etc., corresponding to the rod addressed is activated at either trigger input 26 A-C or 27 A-C in accordance with the information content on the position command bit lines 32 C and 32 D. In general, decoder 30 can be constructed and programmed in essentially the same manner as employed with electronic digital computers, the fundamental exception being that decoder 30 is entirely fluidic in operation.

What is claimed is:

1. In a nuclear reactor including a pressure vessel having a coolant inlet and outlet zone, a core disposed therebetween and from which useful heat is extracted by a coolant fluid, the improvement comprising means for controlling the reactivity level of the core including neutron absorber members moveable in respective guide passages extending with the core, a plurality of flow controllers each disposed within the pressure vessel for communication with a corresponding guide passage, each flow controller being communicated with a source of pressurized fluid and operable in response to reception of a fluidic form trigger signal to communicate the guide passages with the fluid source and thereby establish in the passage a pressurized fluid flow driving the neutron absorber member therein to a given position, and decoder means disposed within the pressure vessel to receive a binary coded command signal presented in fluidic form and identifying a specific neutron absorber member to be moved to such given position, said decoder means being operable in response to the command signal to apply a fluidic form trigger signal to the flow controller associated with the identified neutron absorber member and thereby drive same to said position.

2. The improvement according to claim 1 wherein said decoder means has input means disposed to receive binary coded command signals presented in parallel logic form by a plurality of fluidic lines extending through the pressure vessel wall.

3. The improvement according to claim 1 wherein said source of pressurized fluid includes a pump located within the pressure vessel and having an inlet disposed to receive said coolant fluid and an outlet communicated with each flow controller.

4. The improvement according to claim 1 including restrictor means flow-connecting each of the guide passages to said coolant inlet zone.

5. The improvement according to claim 1 wherein each flow controller includes a bistable flow switching device having one flow switching state in which the corresponding guide passage is communicated with said source, to establish the neutron absorber member in such passage at an out-core position, and another flow switching state in which said source is communicated with the coolant inlet zone to establish said neutron absorber member at an in-core position.

6. The improvement according to claim 5 wherein the guide passage is vertically aligned and the out-core position is elevated above in-core position.

* * * * *